United States Patent [19]

Emilio

[11] 4,454,638
[45] Jun. 19, 1984

[54] SPECIAL LATHE, PARTICULARLY FOR MAKING SETTINGS EXACTLY FITTING THE GEM OR THE LIKE

[76] Inventor: Stanoppi Emilio, Via 5 Giornate, 19 - Cassano Magnago (Varese), Italy

[21] Appl. No.: 248,853

[22] Filed: Mar. 30, 1981

[30] Foreign Application Priority Data

Apr. 11, 1980 [IT] Italy ................................. 83619/80

[51] Int. Cl.³ ............................................. B23P 5/00
[52] U.S. Cl. ..................................... 29/10; 29/27 C; 29/46; 29/48.5 A
[58] Field of Search ............... 29/26 A, 27 C, 10, 41, 29/46, 48.5 A; 408/35; 51/166 T

[56] References Cited

U.S. PATENT DOCUMENTS 1,415,235  5/1922  Garnett ................................. 29/10
2,914,969 12/1959  Mitchell ............................... 408/35

Primary Examiner—Z. R. Bilinsky
Attorney, Agent, or Firm—Morgan, Finnegan

[57] ABSTRACT

A lathe with a number of working tools for making a setting for a gem in metallic objects such as rings or bracelets, the size of the setting being directly determined by taking the diameter of the gem to be set.

2 Claims, 4 Drawing Figures

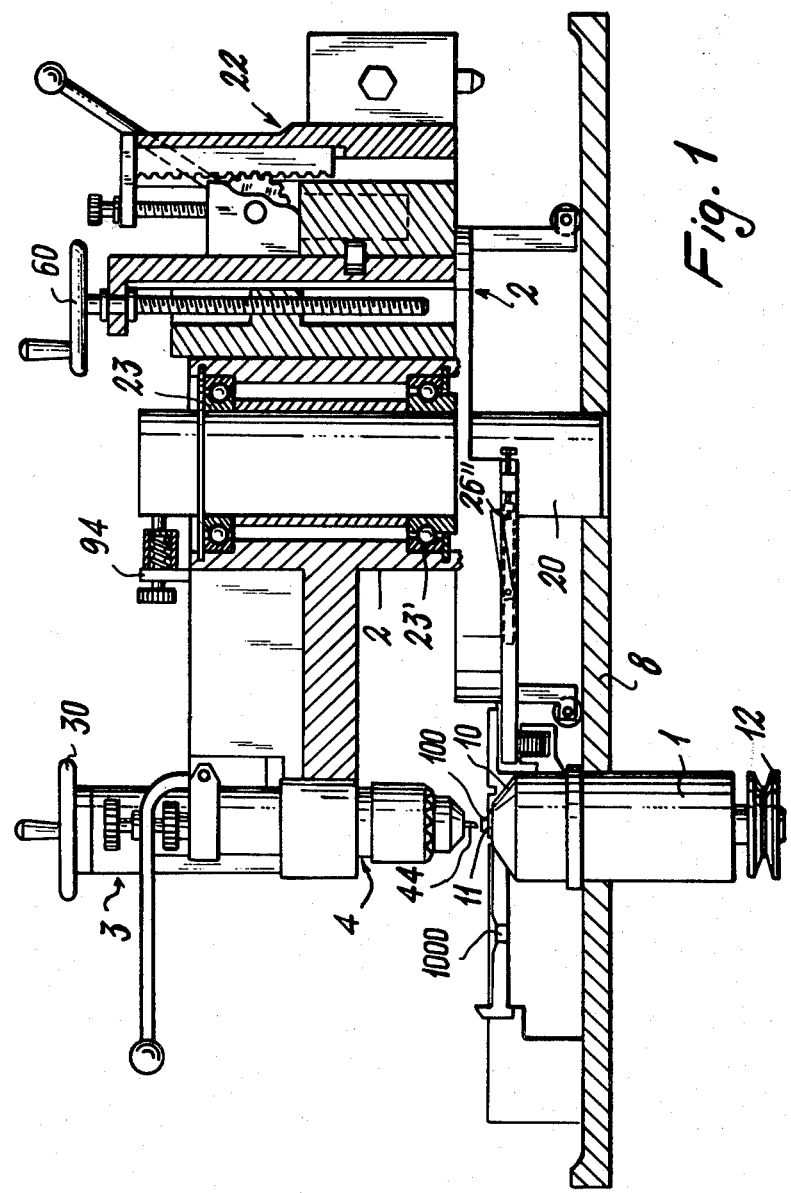

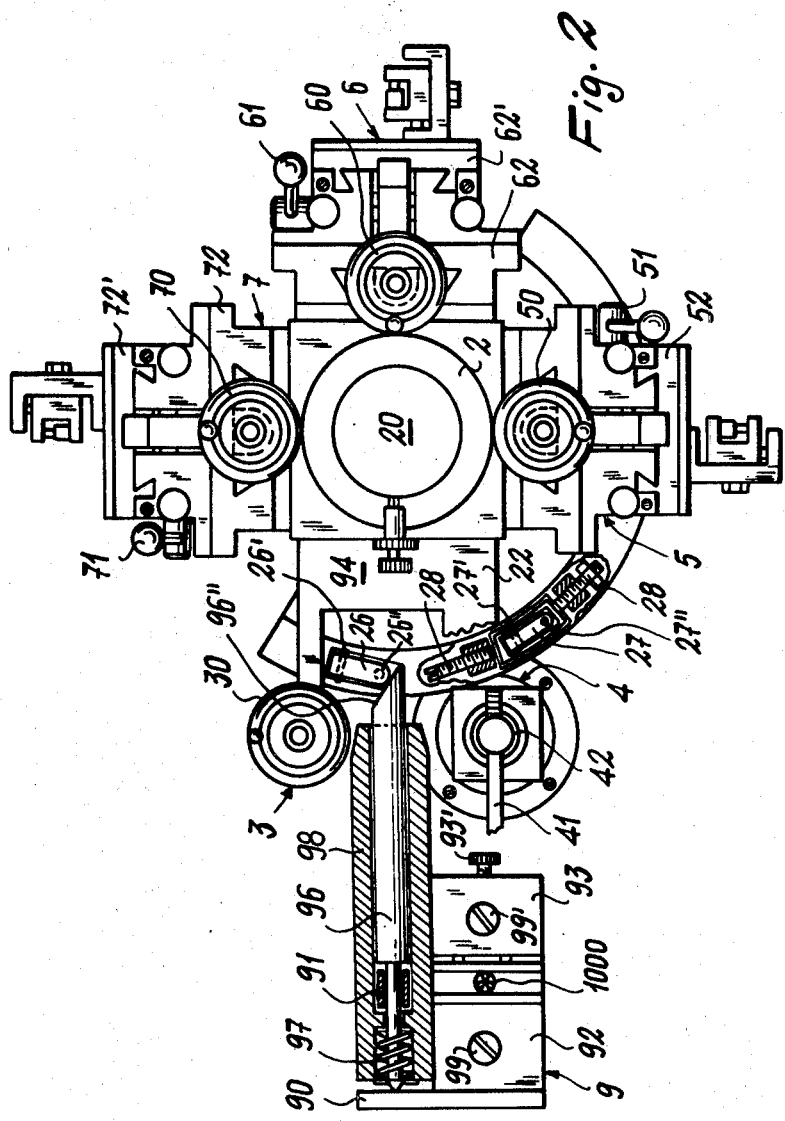

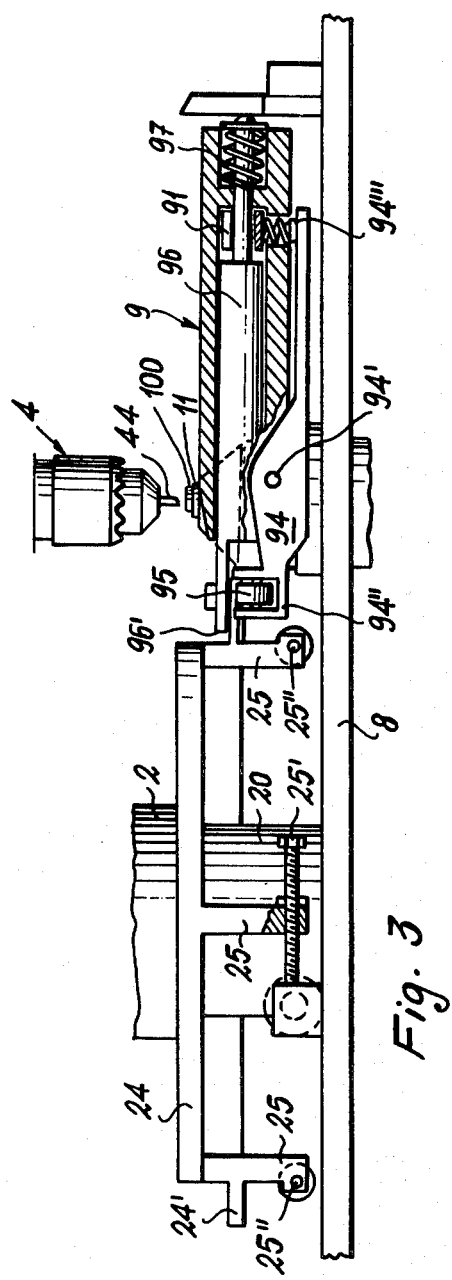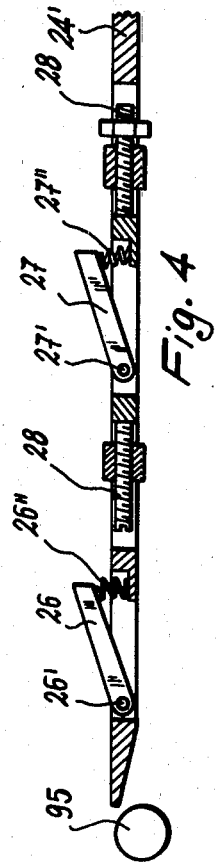

SPECIAL LATHE, PARTICULARLY FOR MAKING SETTINGS EXACTLY FITTING THE GEM OR THE LIKE

BACKGROUND OF THE INVENTION

This invention relates to a lathe provided with a number of working tools for making a setting in metallic objects such as jewels, rings, bracelets and the like, the size of the setting being directly determined by taking the diameter of the gem to be set.

More particularly, a machine according to the invention is characterized by the fact that at least one of the tools is provided with a system which causes the tool for working or the setting to shift on to be adjusted in accordance with the size or dimension of the gem. More specifically, the shifting or adjusting may be applied to both a first traditional tool for the rough grinding or cutting and a second tool for further more precise grinding or cutting of the setting. In accordance with the invention, there are provided three other tools of the riveting type which, by deforming the metallic material, effect the definitive setting and the subsequent finishing work.

In accordance with the invention, the position of at least the first two working tools is varied with respect to the axis of the hole or opening of the setting by means of a mechanical system capable of intented detecting the dimensions of the gem to be set. More particularly, the axial shifting of the tool with respect to the axis of the setting takes place according to a predetermined reduction scale, allowing for the fact that the size to be taken corresponds to the diameter of the gem, while the shifting of tool affects the setting radius.

THE DRAWINGS

To better illustrate the features of the present invention, reference is made to the accompanying drawings which show a schematic and merely explicative practical embodiment of the invention and wherever: FIG. 1 is a partially sectioned view of a lathe according to the invention;

FIG. 2 is a plan view of the lathe of FIG. 1;

FIG. 3 is a partial side view of the lathe itself and;

FIG. 4 is a schematic rectilinear arrangement of the flange carrying the positioning-stopping devices of the revolving turret.

DESCRIPTION OF THE PREFERRED EMBODIMENTS

A lathe according to the invention consists substantially of a head indicated by 1, a tool-carrying turret generally indicated by 2 and five tool-carrying spindles, respectively indicated generally by 3, 4 as shown in FIG. 1 and FIG. 2 and generally by 5, 6, 7 in FIG. 2.

Head 1 is vertically mounted on a horizontal frame 8, and consists of a spindle 10 with a grip 11 receiving motion from a pulley 12 by means of a belt linked to a motor (not shown). Turret 2, which substantially consists of a pillar 20 secured to frame 8, is vertical and therefore parallel to the axis of head 1.

Suitable ball bearings 23, 23' permit a roundabout to rotate around a piller 20, the roundabout supporting a tool-carrying turret generally designated by 22 for positioning said tools as desired above spindle 10.

Tool holder 3 serves for making a first hole or rough setting; tool holder 4 would then grind, cut or shape this first rough setting to the exact diameter of the gem; tool holder 5 would rivet the setting, after the gem has been set; tool holders 6 and 7 would perform the finishing operations that are usually made after setting.

It is to be noted that, if a roundabout turret is used, the tool holders may be as numerous as desired or as required, depending upon the particular kinds of work it is desired to perform on the setting and the diameter of the roundabout system itself.

Tool holders 3, 4, 5, 6 and 7 are provided each with known devices for adjusting their position, such as, in particular, handwheels 30, 50, 60, 70; levers 51, 61, 71, 41; and carriages 42, 52, 62, 62', 72 and 72'.

An important feature of the invention the provision of a gauge vice indicated generally by 9, having movable parts 92, 93 between which there may be housed the gem 1000 for which the setting is to be made; part 92 is secured to a small plate 90 on which there rests, in contrast with spring 97, a piston 96 freely gliding inside a hollow cylinder, 98, ending, at the inner part of the machine, by an inclined plane 96".

On the rod of piston 96 there is disposed a brake 91, which is pushed against the rod by a spring 94''' resting on one end of a lever 94 having a central fulcrum 94' (the opposite end of lever 94 has a throated structure as shown at 94" in FIG. 3).

At the foot of the turret revolving around pillar 20 there is provided a flange 24 (see FIG. 3) to which there are secured a cam 24' and arms 25 provided with set screws 25' and 25" for properly positioning the different tools.

The cam-flange 24' acts on a roller 95 (see FIG. 3) which lowers the end of the throated structure 94" of the lever causing the previously mentioned brake 91 to act on the rod of piston 96.

The flange 24 (see FIG. 2) is provided with at least two catches 26 and 27, set in a circular arrangement, which, for the sake of clarity, are represented in the line-drawing of FIG. 4.

Each catch is supplied with a pin at one end, respectively 26' and 27', and with springs 26" and 27" which push the other end upwards; in particular, catch 27 may shift with respect to flange 24' in a usual way by means of the nut and threaded screw 28.

Catches 26 and 27 are so arranged that each of them may glide against the underside of plane 96" of piston 96 when rotating in one direction, while they would block the entire tool-carrying turret when rotating in the opposite direction; in particular, catch 26 would properly position spindle 4 with respect to head 1, and catch 27 would do the same with the finishing head 3 always with respect to head 1.

The working of the lathe according to the invention is briefly summarized hereunder:

The gem 1000 for which the setting is to be made is put between gauge vice parts 92–93; the movable part 92, together with the small plate 90, properly position piston 96 and the corresponding inclined plane 96" (during these operations brake 91 does not act on the piston rod). The inclination of plane 96" is such that catch 26 blocks and exactly sets the turret so that tool 44 of spindle 4 is brought to bear at a distance from the axis of head 1 equal to half of the gem diameter.

There will be thus automatically obtained the working (grinding first and then finishing) of a setting having a diameter identical (allowing for tolerances) to that of the gem 1000 placed between the vice parts. The same occurs as to the positioning of the subsequent head 3, wherein it is catch 27 which causes the blocking of the angular position of the turret; since the distance between catches 26 and 27 is adjustable at will, it is then possible to control, accordingly, the finishing degree of the setting.

Once these first two operations are over, it is possible to place the gem in the setting and proceed to riveting and to the already mentioned finishings by means of the other tool-carrying heads.

What is claimed is:

1. A lathe for making circular settings for stones or gems consisting of a frame, a rotating spindle having a vertically oriented rotating axis for carrying the workpiece in which the setting is to be made and a rotating turret proviced with a plurality of tool-carrying heads having tools carried therein, a flange provided with a cam and a plurality of one-way catches, disposed on said frame adapted to cooperate with said spindle and bring said tool-carrying heads into the vicinity of the vertical axis thereof when said turret is rotated and shape a setting in said workpiece carried by said spindle, a guage vice located on said frame for holding a stone or gem for which the setting is to be made and which gauge vice includes a piston element provided with an inclined plane at one end and a brake element near the opposite end acting thereon to clamp said piston in place when said stone or gem diameter has been detected by said guage vice, the inclined plane of said piston element contacting said one-way catches on said cam and adjusting the angular positioning of a tool in a tool-carrying head in the vicinity of the vertical axis of said spindle.

2. A lathe according to claim 1 including a central fulcrum lever disposed on the frame, said fulcrum lever having a throated structure on one end and extending to the vicinity of the brake element at the opposite end, and a plurality of rollers linked to the rotating turret which contact the cam disposed on the flange thereof and said throated structure on said lever to lower said lever at the end thereof provided with said throated structure while raising the opposite end thereof and actuating said braking element.

* * * * *